C. & V. SHUMAN.
MEANS FOR MAKING REINFORCED SHEET GLASS.
APPLICATION FILED NOV. 22, 1916.
1,274,206.
Patented July 30, 1918.
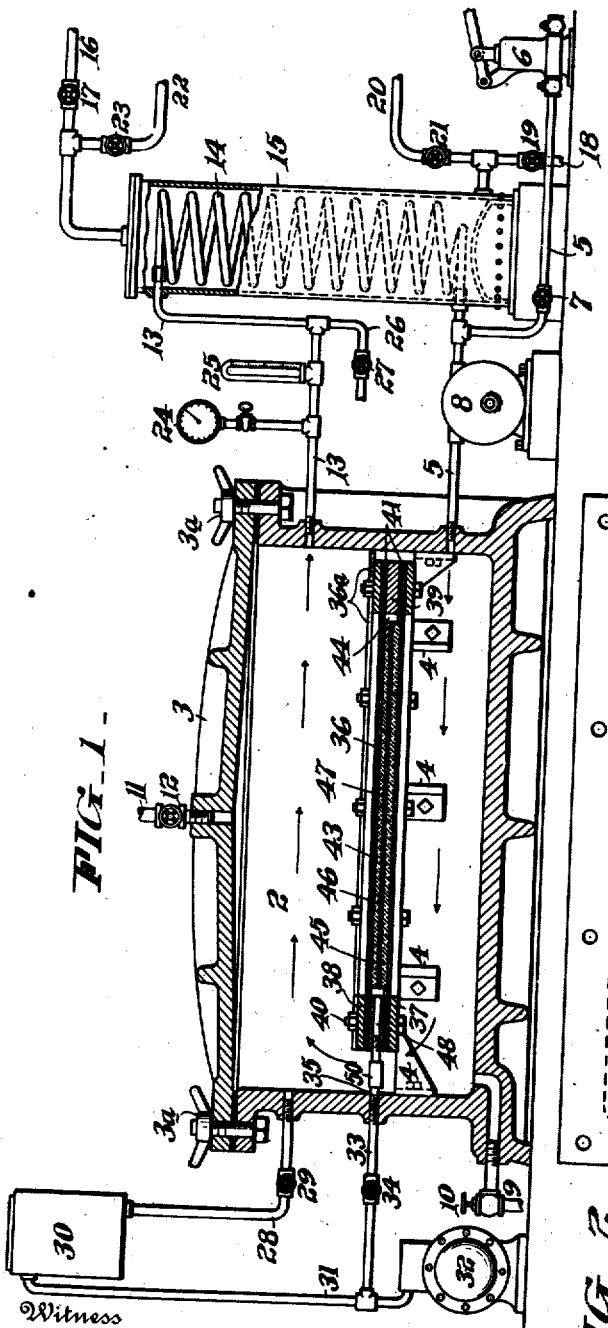
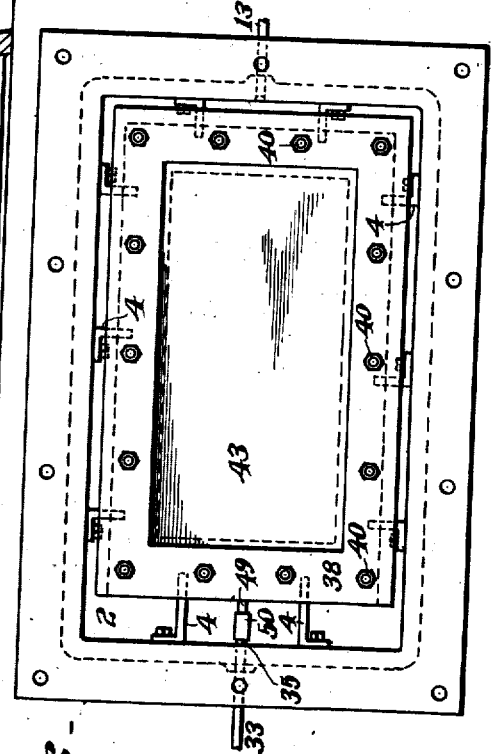

UNITED STATES PATENT OFFICE.

CONSTANTINE SHUMAN AND VICTOR SHUMAN, OF PHILADELPHIA, PENNSYLVANIA.

MEANS FOR MAKING REINFORCED SHEET-GLASS.

1,274,206.

Specification of Letters Patent.

Patented July 30, 1918.

Original application filed April 20, 1916, Serial No. 92,355. Divided and this application filed November 22, 1916. Serial No. 132,733.

*To all whom it may concern:*

Be it known that we, CONSTANTINE SHUMAN and VICTOR SHUMAN, citizens of the United States, and residents of Philadelphia, county of Philadelphia, and State of Pennsylvania, have invented an Improvement in Means for Making Reinforced Sheet-Glass, of which the following is a specification.

The object of our invention is to provide an improved means for making a compound transparent or translucent composite sheet composed of two sheets of glass with an interposed sheet or body of celluloid welded to the glass sheets and uniting them to the celluloid to form a unitary structure.

Heretofore, the making of a transparent composite sheet, by pasting a sheet of celluloid or equivalent material between two sheets of glass by some kind of cement, or by softening and dissolving the surface portions of the celluloid sheet with a solvent of celluloid and with such prepared celluloid sheet pasting the two glass sheets together while under pressure, has been known; these processes have, however, serious objections and the products produced by their use have not been found satisfactory. In case a cement is used, it has been found that the proper results cannot be obtained without adding a material which has a tendency to discolor in them; and in case a solvent is used to dissolve the outer surfaces of the celluloid to form a celluloid cement, it has been found impossible to remove all of the solvent, that remaining imparting a weakening of the product.

In order to secure a desirable transparent compound sheet which shall possess the property of not allowing glass splinters, or pieces to fall off when struck and cracked by a hard blow, we have found it necessary that the compound sheet shall be composed solely of glass and celluloid, the latter in its normal state and not weakened by the addition of any solvent.

Our improved process of making composite, transparent or tranlucent sheets, consists of assembling two sheets of glass (with or without dry celluloid coatings), one on each side of a sheet of celluloid and subjecting the assembled sheets to pressure, and at or before the application of the welding pressure, raising the temperature, preferably to approximately 230 degrees Fahr., next applying a higher pressure, and after maintaining the assembled product under this heat and pressure for a predetermined time, finally lowering the temperature and releasing the pressure before removing the sheet.

Our improved method may be further characterized by employing a vacuum about the associated sheets of glass and celluloid during the application of pressure; and in the most approved adaptation of this feature of our invention, we prefer that the vacuum shall not only be maintained in the space occupied by the sheets, but also within the space containing the pressure applying fluid, whereby the vacuum is essentially for extracting the air from between the glass and celluloid and not for the purpose of applying the operative pressure to insure the welding of the sheets together.

Our invention contemplates the use of a "sheet" containing compartment, from which, preferably, the air may be exhausted, and an inclosing pressure chamber in which a pressure may be created, the wall or walls between the compartment and the inclosing chamber being flexible whereby the pressure of the inclosing chamber may be applied to the sheets of glass and celluloid to press them together to form the welded union, as aforesaid.

Our invention also comprehends certain other features of invention, which, together with those above specified, will be better understood by the more detailed description hereinafter contained and by the definitions thereof recited in the claims.

Our improved apparatus in which to carry out our special process or method is fully illustrated in the drawings, in which:—Figure 1 is an elevation of our improved apparatus with the compartment and chamber in section; Fig. 2 is a plan view of the same with part in section; and Fig. 3 is an enlarged sectional view of a portion of Fig. 1.

2 is a metal pot and is provided with a removable cover 3 which is detachably clamped to the pot by bolts 3ª. The width and length of this pot are required to be large enough to take in the frame 36 in which the glass to be treated is placed, but the height of the pot may be relatively small. Therefore the dimensions of the pot shown are in no way to be taken as limitations. Water or other fluid is delivered into the pot through a pipe 5 and is forced therein by a force pump 6, whereby any desired pressure may be provided. The pipe 5 preferably enters the pot at or near its bottom and a circulating pipe 13 opens from the pot at a materially higher level and communicates with a coil 14 in a tank 15, the other end of the coil being connected with the pipe 5 at a point between the pump 6 and the pot. At a suitable place between the coil 14 and the pot and in the pipe 5 is arranged a circulating pump 8 of any suitable character, the purpose of which is to draw the fluid through the coil 14 and force it into the pot and permit it, after circulation therethrough, to pass by the pipe 13 into the other end of the coil. The pipe 13 is provided with a pressure gage 24 and with a temperature gage 25, so that the pressure within the pot and the temperature of the circulating fluid therein may be readily known at any time during the process. The pipe 5 between the circulating pump 8 and the pressure pump 6 is provided with a shut-off valve 7 which is preferably closed when the circulating pump is in operation. While this valve 7 is not essential in view of the check valves employed in the force pump 6, nevertheless it is desirable to provide a positive valve 7 which may be closed during the circulation of the fluid when under high pressure, that the said pressure may be positively maintained. The tank 15 is provided at the top with a steam pipe 16 having a valve 17 and a water overflow pipe 22 having a valve 23.
The bottom of this tank is provided with a drain pipe 18 having a valve 19, and a water inlet pipe 20 having a valve 21. If the valves 21 and 23 are closed and valves 17 and 19 are opened, steam may pass into the tank around the coils 14 to heat the fluid, and the water of condensation will flow off by the pipe 18. If high pressure steam is employed, the valve 19 may be opened only just sufficient to let the water of condensation drain off under the initial pressure of the steam without permitting an excessive escape of steam. Furthermore, the air liberated by the condensation of the steam is passed over with the water of condensation so that the tank does not become airbound. In this manner, the circulating fluid through the pot 2 may be heated to the desired degree. If, on the other hand valves 17 and 19 are closed and the valves 21 and 23 are opened, then the cold water will enter at the bottom of the tank and fill it and flow out of the pipe 22. In this manner, the circulating fluid through the coils 14 will be cooled. By the apparatus just described, it will be evident that the temperature of the circulating fluid in the pot 2 may be either heated or cooled to any desired degree, and the time in which these actions are accomplished may be predetermined to suit the requirements of the process. During these operations, the temperature conditions may be readily read by the gage 25.

In filling the pot, it is manifest that the same might be filled through the pump 6 and pipe 5, but as this would be slow and not as satisfactory as filling the pot by the normal hydrant pressure of the street mains, we prefer to connect with the pipe 13 a water feed pipe 26 having a valve 27. Furthermore, the cover 3 of the pot is provided with an overflow pipe 11 having a shut-off valve 12. This overflow pipe 11 is preferably located at the highest interior part of the pot chamber, so that air may readily flow out of the pot in the act of filling it, but this is not essential if a vacuum pump is employed as provided for hereinafter. In filling the pot after the cover has been clamped tightly in position, the valves 27 and 12 are opened and the water or fluid passes through pipe 26 and pipe 13 into the pot, while the air flows out of the pipe 11 from the upper part of the pot. When the water completely fills the pot and begins to flow out of the pipe 11, it will be known that the pot is completely full and then the valves 27 and 12 are closed. In the filling of the pot in this manner, there would be no appreciable pressure within the pot, and it will therefore be understood that whatever pressure is required will be provided by the operation of the pressure pump 6 which introduces the additional water that may be required to bring the pressure to the desired degree, as hereinafter described.

When it is desired to drain the pot 2, the valve 10 in the drain pipe 9 opening into the bottom of the pot is opened and the fluid contents runs off, and this is facilitated by the opening of the valve 12 to permit the entrance of the air into the pot.

We will now describe the means of supporting the layers of glass and celluloid in proper relation to insure their being welded together, while being subjected to the action of temperature and pressure provided by the fluid contents of the pot. A frame 36 to provide a hollow chamber 44 is arranged to be supported upon the lateral projections or lugs 4 from the side walls of the pot at a distance above the bottom thereof. This frame 36 comprises a lower rectangular heavy frame 37 and a similar upper rectangular heavy frame 38, between which is clamped a corresponding frame 39 which acts as a spacing frame to insure the proper vertical width of space 44 in which to locate the glass and celluloid. On each side of the frame 39 is a rectangular packing or gasket 41, and arranged between these gaskets and the respective frames 37 and 38 are flexible sheets 42 and 43 of galvanized iron or other suitable metal, or if desired, the lower sheet 42 might be of galvanized iron and the upper sheet 43 of copper to give somewhat more flexibility. The several frames 37, 38 and 39 are bolted together by the numerous bolts 40, and in that manner the frame parts are clamped together to make a fluid-tight chamber 44 between the metal plates 42 and 43. 45 and 46 represent the two sheets of glass, and 47 is a sheet of celluloid arranged between the glass sheets, and these three sheets are placed within the chamber 44 resting upon the lower metal sheet 42 and having the upper sheet 43 close to the surface of the upper sheet of glass. It will be understood that when the pressure is applied to the fluid in the pot surrounding this frame 36, the flexible sheets 42 and 43 will be forced toward each other and press uniformly over the lower operating surfaces of the respective glass sheets and force them tightly upon each side of the celluloid, compressing the latter between them and into tight intimate contact. If air was within the chamber 44, said air would be compressed during the pressing of the sheets together, and the air between the glass and the celluloid would be forced out during the welding operation. We, however, prefer to provide exhausting means by which the air may be exhausted from the chamber 44 after the glass and celluloid have been sealed therein. To permit the exhaustion of the air, the intermediate annular frame 39 is provided with a vent 48 terminating in a tube 49. If it is desired to exhaust the air from the chamber 44 before it is put into the pot, that may readily be done by withdrawing the air through the pipe 49 and sealing it. We prefer, however, to exhaust the air from the chamber 44 after the frame 36 has been placed in the pot 2 and during the operation of the process. The means employed for this purpose and for exhausting the air from the pot 2 itself are as follows:—A vacuum pump 32 is connected by pipes 28 and 31 with the pot 2, and said pipes 28 and 31 extend upward above the top of the pot and preferably connect through a reservoir chamber 30. A valve 29 may be provided in the pipe 28 adjacent to the pot to close the communication with the vacuum devices after the exhaustion has been complete and before the pressure is applied by the pump 6. Branching from the pipe 31 is a pipe 33 having a valve 34, said pipe opening into a passage through the pot wall, the inner end of which is provided with a nipple 35 in alinement with the pipe 49, and these two are connected by a heavy rubber union 50 during the operation of the process. By opening the valve 34, the chamber 44 in the frame 36 may be exhausted of all air, and any desirable extent of vacuum may be provided and maintained, if desired, within the said chamber 44 during the operation of the process. Whatever vacuum is produced in the chamber 44 (in which the glass and celluloid are located), may also be produced in the pot in which the frame is located, when exhausting the air from the chamber 44 and previous to the applying of the pressure in the pot, so that the general pressure conditions inside and outside of the chamber 44 would be the same until the air was exhausted and then the actual operating pressure may be wholly controlled by the pressure pump 6. The provision of a preliminary vacuum in the pot 2 while exhausting the air from the chamber 44, prevents atmospheric pressure (acting through the sheets 42 and 43) from forcing the two glass sheets upon the celluloid during the exhausting of the air from between them, and consequently guards against interference with free withdrawal of the air which might otherwise be entrained. After this action is accomplished, the valve 29, and if desired, the valve 34, will be closed, and then the pressure would be applied in the pot 2 by the pressure pump 6 to introduce the positive pressure for insuring perfect welding between the glass and celluloid. Preliminary to this last operation, namely, the application of the welding pressure, the vacuum in the pot 2 may be broken, and this may be done by simply opening the valve 12 for a moment, and then closing it or by pumping in the water.

While ordinarily, water may be used as the pressure fluid in the pot 2, it is to be understood that we do not restrict ourselves to a liquid, as air or any suitable gas may be employed as the fluid for controlling the pressure and supplying the temperature to the chamber 44 in which the glass and celluloid are located, and therefore in using the word "fluid," we are using it in a generic sense.

While the use of a vacuum in the chamber 44, either with or without a vacuum in the pot as a preliminary operation, is desirable, because it removes any possibility of small bubbles of air remaining between the assembled sheets of glass and celluloid, nevertheless we do not restrict ourselves in this respect, for as before pointed out, the general process may be operated without the use of a vacuum. The special advantage of employing a vacuum in the pot outside of the chamber 44 at the same time that a vacuum is being applied within the chamber 44, resides in the fact that by removing the atmospheric pressure which would be applied to the sheets 42 and 43 (under the conditions of a vacuum in the chamber 44 alone), there is no compression put upon the sheets of glass and celluloid during this exhausting operation, and consequently the atmosphere of the chamber 44 can be rarefied to the highest degree possible, and then while there is no air present in the chamber 44, the pressure may be applied in the pot 2 by means of the fluid and pump 6 to insure the compression of the glass sheets upon the celluloid to provide a perfect welding of the surfaces without any possible entraining of air, even in rarefied condition, between the surfaces of the glass and celluloid.

It will also be seen that by this process of confining the sheet within the inclosed chamber 44 of frame 36, not only are the glass and celluloid in contacting relation in a vacuum, but the union between the glass and celluloid at the edges thereof is thoroughly protected by the inclosing chamber 44 during the time that the pressure is applied within the pot and put upon the surface of the glass from the outside of the frame 36, thereby insuring a very thorough welding and with the celluloid in a perfectly solid and dry condition, so that when the composite glass sheet is subsequently released from its confinement within the frame 36, there is no possibility of the atmospheric pressure entering between the glass and celluloid to interfere in any manner with the perfect welded union which has been made.

Briefly stated, the process of operation for welding together the two sheets of glass 45 and 46 to an intermediate sheet of celluloid 47, is as follows:—The sheets of glass, preferably with their contacting surfaces perfectly clean, are placed upon opposite sides of a clean sheet of celluloid 47, and these sheets are then placed within the frame 36 after the top plate 43 and frame 38 have been removed. These parts are then placed in position and the bolts 40 inserted and tightened so as to make the chamber 44 airtight except so far as communication may be had through the nozzle or tube 49. This frame 36 thus charged with the glass and celluloid is then placed in the pot and rests upon the lugs 4 and preferably with the greatest clearance between the end of the frame and the side of the pot at the end most distant from where the water is circulated through pipe 5. When the frame 36 is placed in position in the pot, the pipe 49 is coupled to the nipple 35 by the rubber union 50.

The valve 10 being closed and the cover 3 being tightly clamped in place, water is admitted by the pipes 26 and 13 into the pot. The air within the pot is allowed to escape through the vent 11, the valve 12 of which has been opened. The water fills the pot as well as the pipes 13, 5 and coil 14, and will also fill the circulating pump 8, and if the valve 7 is opened, the water may extend all the way back to the pressure pump 6. When the water begins to flow from the overflow pipe 11, the valve 12 is closed, the valve 27 is also closed, and the vacuum pump 32 put into operation with the valves 29 and 34 opened. When the desired degree of vacuum has been put upon the chamber 44 and also upon the water in the pot 2, the valve 29 is closed and the valve 34 may also be closed or, if desired, valve 34 may be left open and the vacuum pump may continue to act in maintaining the vacuum within the chamber 44. Any suitable well known means may be employed to indicate the extent of vacuum. After the removal of the air, additional water is pumped into pot 2 by means of the pump 6 until the pressure of the gage 24 indicates about ten pounds. The valve 7 is then closed and the entire fluid contents of the pot and pipes are started into circulation by the circulating pump 8. This circulation enters the pot by pipe 5 passing under the frame 36 to the distant side, thence upward around the end of the frame and back over the frame and thence out by the pipe 13. To insure this circulation to the extreme end of the frame 36, a loose baffle plate 36ª may be allowed to rest upon the top of the frame 36 closing the space between the pot and frame at its sides and end nearest to the pipes 5 and 13, as indicated at 36ª in Fig. 1, and in dotted lines in Fig. 2. The fluid from the pipe 13 passes through the coil 14 and back to the pump 8. During this circulation, steam is turned on to the tank 15 by valve 17, and in passing over the coil 14 gives up its latent heat to the circulating fluid within the coil and the condensed water passes to the bottom and out by pipe 18 and valve 19. The temperature of the circulating fluid is gradually raised until the fluid is heated to about 230 degrees Fahr. This temperature of the fluid is conducted to the glass and celluloid and softens the latter, while held under the gentle pressure of ten pounds per square inch. The temperature of the circulating fluid may be observed by the thermometer 25 and in this manner regulated as may be required. After the temperature has reached about 230 degrees Fahr., and while the fluid is still being circulated by the rotary pump 8, a small additional amount of fluid is pumped into the system by the pump 6, the valve 7 being temporarily opened for the admission of this additional fluid. This addition of the circulating fluid is made very gradually and until the pressure gage 24 indicates a pressure of about one hundred pounds (by way of example). This increased pressure is therefore applied to the celluloid between the two glass sheets and at a time that the celluloid is softened by the temperature of the circulating fluid. After a reasonable length of time to insure full setting of the glass and celluloid into thorough and intimate contact (which may be from five to thirty minutes, according to the thickness of the glass), the steam is shut off by valve 17 and valve 19 is also closed. Cold water is then admitted by valve 21 and allowed to overflow by opening the valve 23. This cold water flows over the coils 14 and cools the circulating fluid, the latter still being circulated by the rotary pump 8. In this manner, the circulating fluid is cooled until the thermometer indicates about 100 degrees Fahr., which is sufficiently low for handling and removing the glass.

After the circulating fluid and the glass within the frame 36 have thus been cooled, the pressure is gradually released by opening the overflow valve 12 until atmospheric pressure is within the pot 2. The drain valve 10 is then opened and the fluid contents run off from the pot 2 by the drain pipe 9, or at least sufficiently low to expose the frame 36 containing the glass and celluloid. The cover 3 of the pot 2 is then removed. The vacuum valve 34 is then closed. The frame 36 is then lifted out, having been disconnected from the rubber tube 50. The vacuum is thus broken within the chamber 44. The frame 36 may then be opened by removing the nuts from the bolts 40 and lifting off the upper frame 38 and its flexible metal sheet 43. The composite glass and celluloid sheet is then removed.

While we have designated certain temperatures and pressures by way of example, we do not restrict ourselves to the same as any temperatures and pressures suitable may be employed, but those stated have been found satisfactory in commercial practice. In some cases, the welding pressure may be raised very high even to one thousand pounds or more per square inch where very thick plates of glass are to be welded to the celluloid.

While we have described the preferred method of producing the desired sheets of composite material, especially where sheets of thin glass and large area are to be united to the celluloid, nevertheless for small sheets and especially where the glass is thick, the particular steps of the process may be varied. For instance, if the composite sheet is to be of medium area and be formed of thick glass, the entire pressure may be promptly applied even before the heating of the glass and celluloid takes place, or the heating and the pressure may be applied at the same time. It will be understood of course that to insure a proper weld between the celluloid and the glass, it is essential that the celluloid shall be heated so as to be softened and conform to the general surface of the glass at the time that the pressure is being applied, but the immediate time of application of heat may be before or during the application of such welding pressure. In the case of thin sheets where the glass might readily crack, it is preferable to first apply the temperature to soften the celluloid before applying the welding pressure. It is also to be understood that while it is preferable (where thin sheets of glass are employed) that there shall be a preliminary low pressure applied to the glass and celluloid sheets before the celluloid is softened, and before the application of a full pressure, this preliminary low pressure may be omitted where desired, and especially where the glass sheets are relatively thick.

It will be observed that in forming a composite sheet of celluloid with outer glass faces in the manner herein described, the two glass sheets are held together by the celluloid sheet which is welded to each of the glass sheets and acts as a binder between them, and this welding operation is by thorough intimate contact between the glass and celluloid with the complete exclusion of air, and consequently a most practical and strong structure is secured. It will further be noted that when the welding is done in this perfect manner, the transparency of the composite glass and celluloid sheet is most excellent; and as celluloid alone is used between the two glass sheets, the tendency to discoloration is eliminated.

While it is most desirable that the two sheets of glass and an interposed sheet of celluloid are alone employed, it will be manifest that the same process may be carried out where the glass surfaces to be welded are first painted or coated by painting or spraying with a very thin layer of celluloid dissolved in a solvent which, for example, may be a mixture of 95% alcohol and 5% crystallized camphor, and when dry placed upon opposite sides of a sheet of celluloid with their painted or coated surfaces in contact therewith. A coating of this kind sticks very tightly to the glass; and after all of the solvent has been evaporated (which may be assisted by high temperature or otherwise), the remaining deposit is pure celluloid as a thin skin on the glass and very tightly adherent thereto. As celluloid will weld somewhat better to celluloid than it will to glass, this pre-treatment of the glass to obtain a very thin skin of pure adhering celluloid is an advantage to the process and the product.

This reference to the coating of the glass with celluloid in a solvent is not to be confused with the idea of sticking the glass sheets together by said coatings as a cement and subsequently evaporating the solvent, as the solvent in this case is a mere incident to coating the surface of the glass with a very thin layer of pure tightly adhering celluloid which is in a dry hard condition upon each sheet of the glass before they are assembled in connection with the celluloid sheet within the apparatus and to receive treatment by the special process herein set out. The result is a true welding together of a surface of adherently coated dry celluloid to another surface of celluloid under heat and pressure.

It will now be apparent that we have devised a novel and useful method and means for carrying the same into practice and produce thereby an improved product as an article of manufacture, which embody the features of advantage enumerated herein as desirable, and while we have in the present instance shown and described by way of example the preferred embodiments thereof which have been found in practice to give satisfactory and reliable results, it is to be understood that we do not restrict ourselves to the details, as the same are susceptible of modification in various particulars without departing from the spirit or scope of the invention.

In this application no claim is made to the method or article, as these are set out and claimed in our applications Ser. No. 92,355, filed April 20, 1916 (parent case) and Ser. No. 132,732, filed November 22, 1916 (a division from the parent case).

Having now described our invention, what we declare is new and desire to secure by Letters Patent, is:—

1. In apparatus of the character stated, the combination of a hollow frame providing a sealed compartment with opposite metallic sides relatively flexible and providing a shallow compartment of relatively small depth and large area, said compartment having means for permitting the insertion and sealing within the same of the articles to be treated, an inclosing pot in which the hollow frame is arranged so as to expose both of its metallic sides, means for supplying the pot with fluid, means for alternately heating and cooling the fluid, and means for varying the pressure of the fluid.

2. In apparatus of the character stated, the combination of a hollow frame providing a sealed compartment with opposite sides relatively flexible and providing a shallow compartment of relatively small depth and large area, said compartment having means for permitting the insertion and sealing within the same of the articles to be treated, an inclosing pot in which the hollow frame is arranged, means for supplying the pot with fluid, means for alternately heating and cooling the fluid consisting of a coil in communication with different portions of the pot and through which the fluid is circulated, an inclosing tank about the coil, and means to circulate a heating fluid and a cooling fluid at will through the tank and about the coils, and means for varying the pressure of the fluid.

3. In apparatus of the character stated, the combination of a hollow frame providing a sealed compartment with opposite sides relatively flexible and providing a shallow compartment of relatively small depth and large area, said compartment having means for permitting the insertion and sealing within the same of the articles to be treated, an inclosing pot in which the hollow frame is arranged, means for supplying the pot with fluid, means for alternately heating and cooling the fluid, means for varying the pressure of the fluid, and means to circulate the fluid about the hollow frame to insure the same being heated and cooled uniformly.

4. In apparatus of the character stated, the combination of a hollow frame providing a sealed compartment with opposite metallic sides relatively flexible and providing a shallow compartment of relatively small depth and large area, said compartment having means for permitting the insertion and sealing within the same of the articles to be treated, an inclosing pot in which the hollow frame is suspended, means for supplying the pot with fluid to surround the hollow frame, means for circulating the fluid, means for alternately heating and cooling the same circulating fluid, means for varying the pressure of the fluid independently of its heating means, and means to produce a vacuum within the hollow frame while being subjected to the action of the fluid outside of the frame.

5. In apparatus of the character stated, the combination of a hollow frame providing a sealed compartment with opposite metallic sides relatively flexible and providing a shallow compartment of relatively small depth and large area, said compartment having means for permitting the insertion and sealing within the same of the articles to be treated, an inclosing pot in which the hollow frame is suspended, means for supplying the pot with fluid to surround the hollow frame, means for circulating the fluid, means for alternately heating and cooling the same circulating fluid, means for varying the pressure of the fluid independently of its heating means, and means to produce a vacuum within the hollow frame while being subjected to the action of the fluid outside of the frame consisting of a vacuum pump, a pipe from the vacuum pump extending into the pot, and a tubular connection between the vacuum pump and the interior of the hollow frame.

6. In apparatus of the character stated, the combination of a hollow frame providing a sealed compartment with opposite sides relatively flexible and providing a shallow compartment of relatively small depth and large area, said compartment having means for permitting the insertion and sealing within the same of the articles to be treated, an inclosing pot in which the hollow frame is arranged, means for supplying the pot with fluid, means for alternately heating and cooling the fluid, means for varying the pressure of the fluid, and means to remove the atmospheric pressure both from the pot and from the interior chamber of the hollow frame.

7. In apparatus of the character stated, the combination of a hollow frame providing a sealed compartment with opposite sides relatively flexible and providing a shallow compartment of relatively small depth and large area, said compartment having means for permitting the insertion and sealing within the same of the articles to be treated, an inclosing pot in which the hollow frame is arranged, means for supplying the pot with fluid, means for alternately heating and cooling the fluid, means for varying the pressure of the fluid, and means to remove the atmospheric pressure both from the pot and from the interior chamber of the hollow frame consisting of a vacuum pump, pipes leading from the vacuum pump and communicating with the interior of the pot and with the interior of the hollow frame, and a valve device for controlling the pipe leading from the vacuum pump to the pot whereby it may be closed when the pressure is applied to the pot.

8. In apparatus of the character stated, the combination of a hollow frame providing a sealed compartment with opposite flexible metallic sides relatively flexible and providing a shallow compartment of relatively small depth and large area, said compartment having means for permitting the insertion and sealing within the same of the articles to be treated, an inclosing pot in which the hollow frame is suspended to expose both of its flexible metallic sides, means for supplying the pot and around the sealed compartment for simultaneously applying pressure equally upon both sides with fluid, means for alternately heating and cooling the fluid, means for varying the pressure of the fluid, a valve controlled fluid supply to the pot, a valve controlled overflow from the pot, and a valve controlled drain from the pot.

9. In apparatus of the character stated, the combination of a closed pot, means for introducing and removing a fluid into the closed pot, means for varying the temperature of the fluid, means for varying the pressure of the fluid, and a removable hollow frame arranged to be loosely held within the pot above its bottom and consisting of three annular frames having arranged between them metallic sheets of flexible material, and clamping bolts for clamping the several annular frames together and upon the metallic sheets to provide a hollow chamber between the flexible sheets of relatively small depth and large area and into which the material to be subjected to treatment is placed.

10. In apparatus of the character stated, the combination of a closed pot, means for introducing and removing a fluid into the closed pot, means for varying the temperature of the fluid, means for varying the pressure of the fluid, and a removable hollow frame arranged to be loosely held within the pot above its bottom and consisting of three annular frames having arranged between them metallic sheets of flexible material, and clamping bolts for clamping the several annular frames together and upon the metallic sheets to provide a hollow chamber between the flexible sheets of relatively small depth and large area and into which the material to be subjected to treatment is placed, the intermediate annular frame provided with an exhausting tubular passage, a vacuum creating device having a vacuum passage extending through the wall of the pot, and a detachable tubular connection between the vacuum passage and the exhausting tubular passage of the hollow frame.

In testimony of which invention we hereunto set our hands.

CONSTANTINE SHUMAN.
VICTOR SHUMAN.

Witnesses:
CHAS. H. DUNKER,
ADELAIDE B. WATSON.